(12) United States Patent
Lee et al.

(10) Patent No.: US 7,770,038 B2
(45) Date of Patent: Aug. 3, 2010

(54) POWER CONTROL APPARATUS AND METHOD OF TERMINAL DEVICE, METHOD OF DISPLAYING SHUTDOWN STATE OF TERMINAL DEVICE, AND METHOD OF DRIVING TERMINAL DEVICE

(75) Inventors: Jung Hwan Lee, Seoul (KR); Grant Eo, Osan (KR)

(73) Assignee: LG Electronics Inc., Seoul (KR)

( * ) Notice: Subject to any disclaimer, the term of this patent is extended or adjusted under 35 U.S.C. 154(b) by 674 days.

(21) Appl. No.: 11/679,944

(22) Filed: Feb. 28, 2007

(65) Prior Publication Data

US 2008/0180264 A1    Jul. 31, 2008

(30) Foreign Application Priority Data

Jan. 25, 2007    (KR) .................... 10-2007-0007971

(51) Int. Cl.
*G06F 1/00* (2006.01)
*G08B 21/00* (2006.01)
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl. .................. 713/300; 340/636.15; 700/286
(58) Field of Classification Search ................. 713/300; 714/14, 22, 47, 48; 700/286; 340/636.15
See application file for complete search history.

(56) References Cited

U.S. PATENT DOCUMENTS 5,598,567 A * 1/1997 Ninomiya .................... 713/310

(Continued)

FOREIGN PATENT DOCUMENTS

CN    1210292 A    3/1999

(Continued)

OTHER PUBLICATIONS

Chinese Office Action dated for Sep. 18, 2009 for Application No. 2007100877282, 12 pages (non English language).

*Primary Examiner*—Thomas Lee
*Assistant Examiner*—Brandon Kinsey
(74) *Attorney, Agent, or Firm*—Fish & Richardson P.C.

(57) ABSTRACT

The present invention relates to a power control apparatus and method for preventing a system from being repeatedly booted and shut off by re-setting a cut-off voltage when the system is shut down by a cutoff mode. The power control apparatus of a terminal device according to the present invention comprises a power controller 30 for controlling power supplied from a battery 10 to the terminal device; and a memory 60 for storing a cutoff voltage value for shutting down a system if a voltage of the battery 10 is lower than a reference value, wherein the power controller 30 sets a flag when the system is shut down by a cutoff mode. When the system is rebooted, it is determined whether to drive the system based on an additional cutoff voltage, if the flag is set. According to the present invention, it is possible to prevent the system from being shut down by the cutoff mode after it has been driven. Therefore, there is an advantage in that the life span of the battery can be extended and the charging time of the battery can be saved.

16 Claims, 6 Drawing Sheets

U.S. PATENT DOCUMENTS

| | | | |
|---|---|---|---|
| 5,710,931 A * | 1/1998 | Nakamura et al. | 713/323 |
| 6,507,173 B1 * | 1/2003 | Spiridon et al. | 320/162 |
| 7,062,661 B1 * | 6/2006 | Na | 713/300 |
| 2007/0099046 A1 * | 5/2007 | Nakano | 429/22 |

FOREIGN PATENT DOCUMENTS

| | | |
|---|---|---|
| JP | 2000-306312 | 11/2000 |

* cited by examiner

POWER CONTROL APPARATUS AND METHOD OF TERMINAL DEVICE, METHOD OF DISPLAYING SHUTDOWN STATE OF TERMINAL DEVICE, AND METHOD OF DRIVING TERMINAL DEVICE

BACKGROUND OF THE INVENTION

1. Field of the Invention

The present invention relates to a power control apparatus and method for preventing a system from being repeatedly booted and shut off by re-setting a cut-off voltage when the system is shut down by a cutoff mode.

2. Description of the Related Art

Recently, a terminal device has a function of making a backup of working contents and automatically shutting down a system (hereinafter, referred to as a 'cutoff mode') when the battery of the terminal device is discharged below a predetermined value.

However, voltage of the battery varies according to loads on the central processing unit (CPU) and peripheral systems.

Accordingly, the prior art has the following problems.

That is, in a case where the system has been shut down by the cutoff mode while it is driven, the voltage of the battery is measured relatively high if the terminal device is driven until all peripheral devices are driven. Therefore, as the system has been driven and the load of the system is increased after a while, the voltage of the battery falls below the cutoff voltage. Thus, the system is again shut down by the cutoff mode.

Further, the prior art has a problem in that the system is repeatedly booted and shut down and thus the battery and system are excessively damaged.

In addition, since the battery is pre-charged in a low voltage state, the system is repeatedly turned on or off until the voltage of the battery is discharged to the bottom. Therefore, there is another problem in that charging time is extended (the aforementioned pre-charging is performed at a rate of 0.1 times as fast as the general charging).

SUMMARY OF THE INVENTION

The present invention is conceived to solve the aforementioned problems in the prior art. Accordingly, an object of the present invention is to provide a power control apparatus and method for a terminal device, wherein a previous shutdown state of the system is displayed and whether to drive the system is determined in accordance with a different cut-off voltage based on the displayed shutdown mode.

Another object of the present invention is to provide a power control apparatus and method for a terminal device, wherein if the system has been shut down by a cutoff mode, it is possible to prevent the system from being driven until a battery is charged to a predetermined level.

According to an aspect of the present invention for achieving the objects, there is provided a power control apparatus of a terminal device, comprising a power controller for controlling power supplied from a battery to the terminal device; and a memory for storing a cutoff voltage value for shutting down a system if a voltage of the battery is lower than a reference value. In such a case, the power controller sets a flag when the system is shut down by a cutoff mode.

At this time, the memory stores first and second cutoff voltages, and if the flag has been already set when the system is driven, the power controller determines whether to apply power to the system based on the second cutoff voltage.

Further, the second cutoff voltage may be higher than the first cutoff voltage.

In addition, the second cutoff voltage may be a battery voltage value measured when only a central processing unit (CPU) of the system is driven, in a state where the system is mounted with a battery having a voltage of the first cutoff voltage when the system is driven.

Furthermore, if the system is shut down by the cutoff mode within a predetermined period of time after the system has been driven, the power controller may set the cutoff voltage to a battery voltage measured when the system is driven.

According to another aspect of the present invention, there is provided a power control apparatus of a terminal device, comprising a power controller for controlling power supplied from a battery to the terminal device to cut off the supply of power if a flag has been set; and a memory for storing a cutoff voltage value for shutting down a system if a voltage of the battery is lower than a reference value. In such a case, the power controller sets the flag when the system is shut down by a cutoff mode, and the controller measures charging time of the system to release the flag only when the charging time is greater than or equal to a set value.

According to the present invention so configured, it is possible to prevent the system from being shut down by the cutoff mode after it has been driven. Therefore, there is an advantage in that the life span of the battery can be extended and the charging time of the battery can be saved.

DETAILED DESCRIPTION OF THE INVENTION

The concept of the present invention is such that when a system is driven, it is determined whether the system has been shut down by the request of a user or by means of the cutoff mode due to the discharge of a battery 10.

If the system has been shut down by means of the cutoff mode, it is determined whether to drive the system based on a cutoff voltage that is set high.

Here, the cutoff mode means that the system is shut down when the remaining voltage of the battery is lowered below a predetermined level. Further, the cutoff voltage is the predetermined level where the system is operated in the cutoff mode.

Accordingly, the present invention includes displaying the system shutdown type and includes a variety of methods for setting the cutoff voltage according to the system shutdown type.

In addition, setting a flag used herein is displaying the cutoff mode when the system is shut down by the cutoff mode. That is, if the flag is set, the system has been shut down by the cutoff mode. The set value of the flag is stored in the memory within the system.

Hereinafter, preferred embodiments of the present invention will be described in detail with reference to the accompanying drawings.

First, a specific embodiment of a power control apparatus of a terminal device according to the present invention will be described below.

Figure 1:
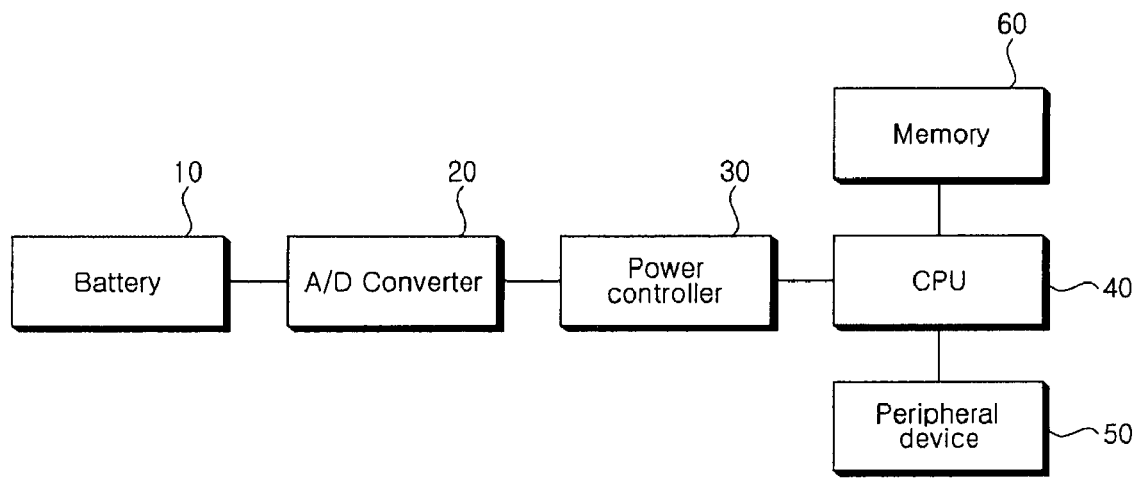
FIG. 1 is a block diagram showing the configuration of a power control apparatus according to a specific embodiment of the present invention.

As shown in FIG. 1, a power control apparatus of the present invention comprises a battery 10 for supplying power to a terminal device. The battery 10 is connected to an analog to digital converter (A/D converter) 20 to convert electric current supplied from the battery 10 such that the current can be suitably used in the terminal device. At this time, the A/D converter 20 may be omitted according to the types of the battery 10 or electronic devices.

Meanwhile, the power control apparatus of the present invention comprises a power controller 30 for controlling electric current supplied from the battery 10 to a central processing unit 40 (hereinafter, referred to as a 'CPU') and peripheral devices 50. The power controller 30 confirms the system shutdown mode and compares the present voltage of the battery 10 with the cutoff voltage to determine whether to drive the system. As a matter of course, the power controller 30 may be included in the CPU in some cases. In the present invention, however, they will be described as separate components for the convenience of explanation.

Furthermore, the power control apparatus of the present invention comprises a memory 60 in which one or more cutoff voltage values are stored.

According to a first embodiment of the present invention, the memory 60 stores first and second cutoff voltages. At this time, the first cutoff voltage is a cutoff voltage value that is used when the flag is not set, i.e. when the system is normally shut down and driven by the request of a user. The second cutoff voltage is a cutoff voltage that is used when the flag is set.

The second cutoff voltage is higher than the first cutoff voltage and can be merely set higher than the first cutoff voltage by a predetermined level (Generally obtained by experiments).

More specifically, however, if the system is driven again with a battery 10 that is used when a system has been shut down by the cutoff mode, the second cutoff voltage is set to a voltage value of the battery 10 that is measured when only the CPU is driven and the peripheral devices are not yet driven.

Alternatively, according to a second embodiment of the present invention, the cutoff voltage can be set to a voltage value of the battery 10 that is measured when the system is repeatedly shut down by the cutoff mode.

On the other hand, according to a fourth embodiment of the present invention, the system is prohibited from being driven when the flag has been set, and the charging time of the battery 10 is measured such that the flag can be released only after a predetermined charging time.

The operation of the power controller 30 will be described in detail when the operation method of each embodiment of the present invention is illustrated below.

Hereinafter, the operation of the present invention will be described in detail through various embodiments of a power controlling method of a terminal device according to the present invention.

The power control method of a terminal device according to the present invention is divided into a method of displaying the shutdown state of the terminal device and a method of driving the terminal device. Thus, the power control method of a terminal device will be described according to the methods divided as above.

Figure 2:
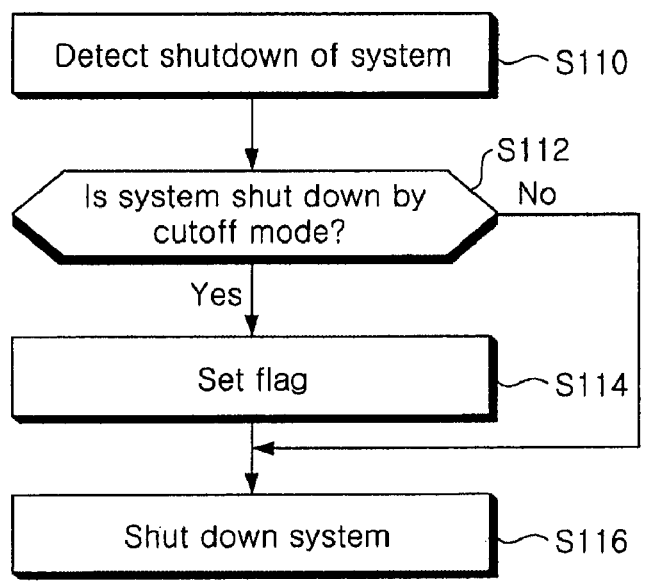
FIG. 2 is a flowchart illustrating a method of displaying a shutdown state of a terminal device according to a first embodiment of the present invention.
Figure 3:
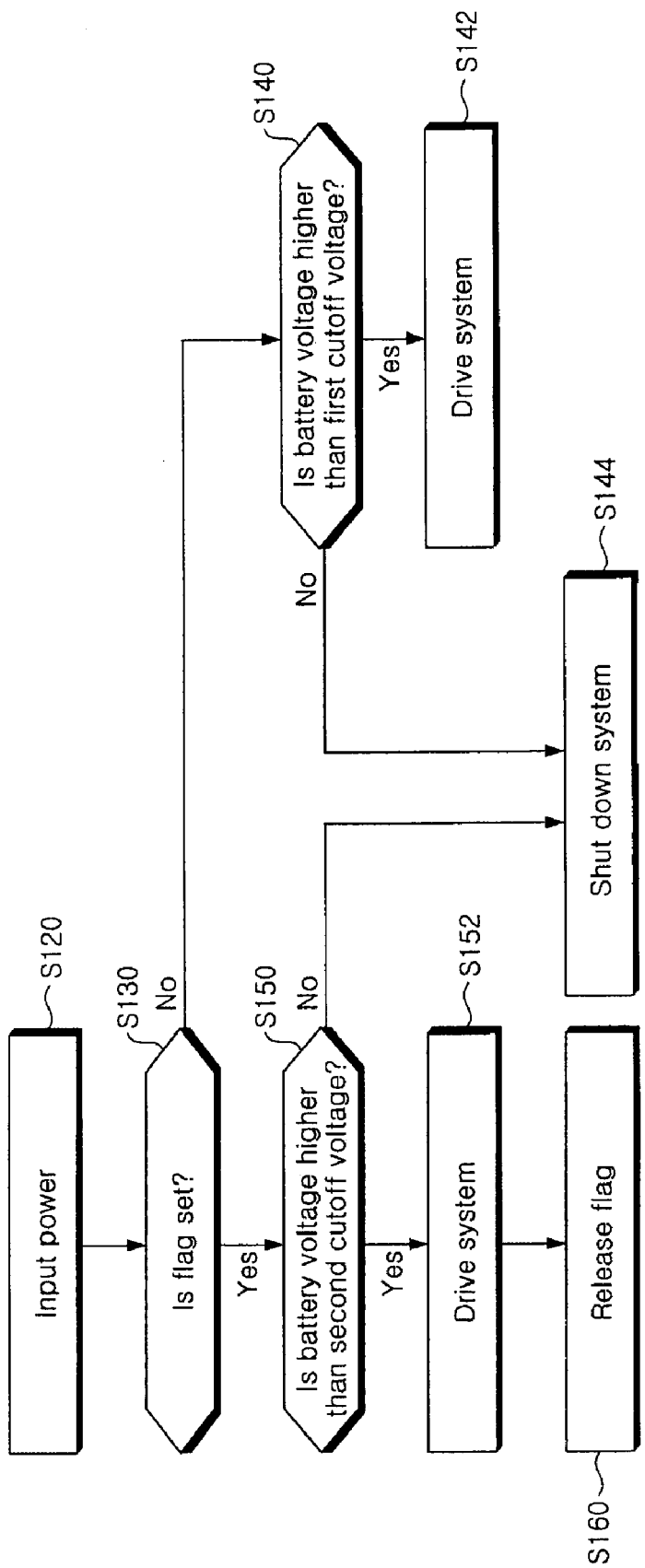
FIG. 3 is a flowchart illustrating a method of driving a terminal device according to the first embodiment of the present invention.

As shown in FIGS. 2 and 3, in order to control the power of a terminal device according to the first embodiment of the present invention, a system shutdown signal is first detected when the system is shut down (S110). After the system shutdown signal has been detected, it is determined whether the system is shut down by the cutoff mode (S112).

Then, if it is determined that the system is shut down by the cutoff mode, a flag is set (S114). The flag is to indicate whether the system has been shut down by the cutoff mode, at the time when the terminal device is driven. To this end, a function supported by an operating system of the terminal device can be utilized or an additional display area can be provided on the power control apparatus.

After the flag has been set, the system is shut down and power is then cut off (S116).

Thereafter, if a system driving signal is inputted to the terminal device, the signal is detected (S120) (refer to FIG. 3). Then, it is determined whether the flag is set in the system (S130).

At this time, if the flag is not set, the system has not been shut down by the cutoff mode. Thus, it is determined whether to drive the system using a general cutoff voltage. That is, the present voltage of the battery 10 is compared with the first cutoff voltage (S140). Then, if the present voltage of the battery 10 is higher than the first cutoff voltage, the system is driven (S142). Otherwise, the system is shut down (S144).

On the other hand, if it is determined in step S130 that the flag has been set, the present voltage of the battery 10 is compared with the second cutoff voltage (S150). If the present voltage of the battery 10 is higher than the second cutoff voltage, the system is driven (S152). If the present voltage of the battery 10 is lower than or equal to the second cutoff voltage, the system is shut down (S144). Furthermore, once the system has been driven, the set flag is released (S160).

A method of displaying the shutdown state of a terminal device according to the second embodiment of the present invention is the same as the method of the first embodiment. That is, since steps S110 to S116 of the first embodiment are performed similarly in the second embodiment, detailed descriptions thereof will be omitted herein.

Figure 4:
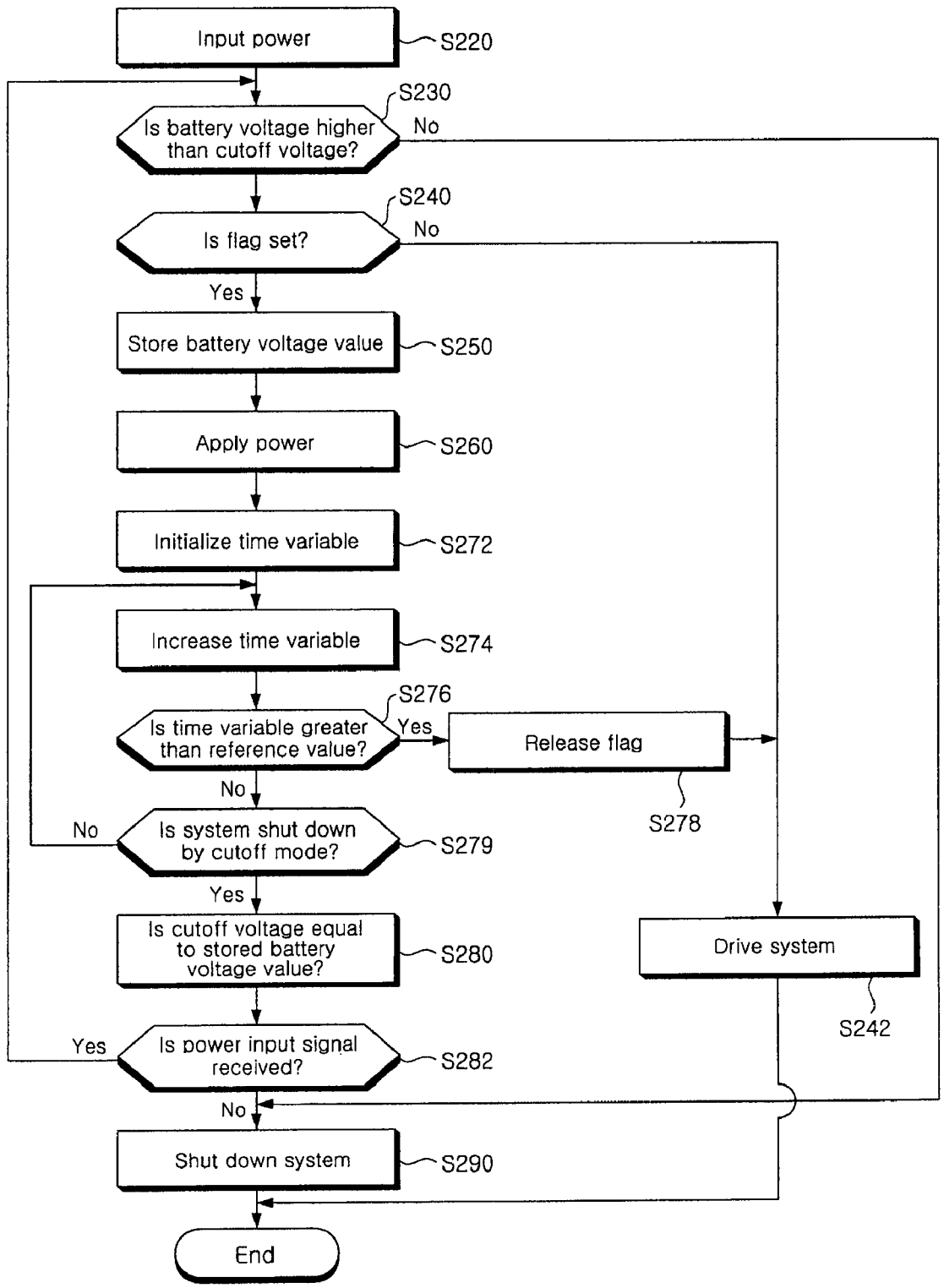
FIG. 4 is a flowchart illustrating a method of driving a terminal device according to a second embodiment of the present invention.

As shown in FIG. 4, in order to control the power of a terminal device according to the second embodiment of the present invention, it is first detected whether a system driving signal is inputted to the terminal device (S220).

Then, a voltage of the battery 10 is compared with a predetermined cutoff voltage (S230). If the voltage of the battery 10 is not higher than the cutoff voltage, the system is shut down. If the voltage of the battery is higher than the cutoff voltage, it is determined whether the flag has been set in the system (S240).

If the flag has not been set, the system is driven (S242). Otherwise, the voltage value of the battery 10 that is currently measured is stored (S250).

Thereafter, power is applied to the system to drive the system (S260). At this time, the system may be driven at any time after step S230.

In the second embodiment of the present invention, it is checked whether the power is shut down by the cutoff mode within a predetermined period of time. That is, it means that the system may be initially driven at a higher voltage level of the battery 10 and then be converted into the cutoff mode due to the voltage of the battery 10 which is decreased as the peripheral devices 50 are driven. Accordingly, the predetermined period of time is a period of time from a point when the terminal device starts to be driven to a point when all the peripheral devices 50 are driven.

The monitoring of the cutoff mode starts with initializing a time variable (S272). Then, the time variable is increased by a predetermined increment (S274). Thereafter, it is determined whether the time variable exceeds a reference value (S276). At this time, the reference value is a value corresponding to the predetermined period of time as described above.

If it is determined in step S276 that the increased time variable is greater than the reference value, the voltage of the battery 10 is considered to be higher than the cutoff voltage and the set flag is thus released (S278).

If the system is shut down in a state where the increased time variable does not exceed the reference value, the cutoff voltage is set to the voltage of the battery 10 stored in step S250 when the system is driven at the next time (S280). Accordingly, the cutoff voltage is increased and set as the voltage of the battery 10.

Next, the system waits for a system driving signal (S282), and returns to step S230 to perform the aforementioned steps if a system driving signal is received.

A method of displaying the shutdown state of a terminal device according to a third embodiment of the present invention is the same as the method of the first embodiment. Accordingly, steps S110 to S116 of the first embodiment are performed similarly in the second embodiment, and thus, detailed descriptions thereof will be omitted herein.

Figure 5:
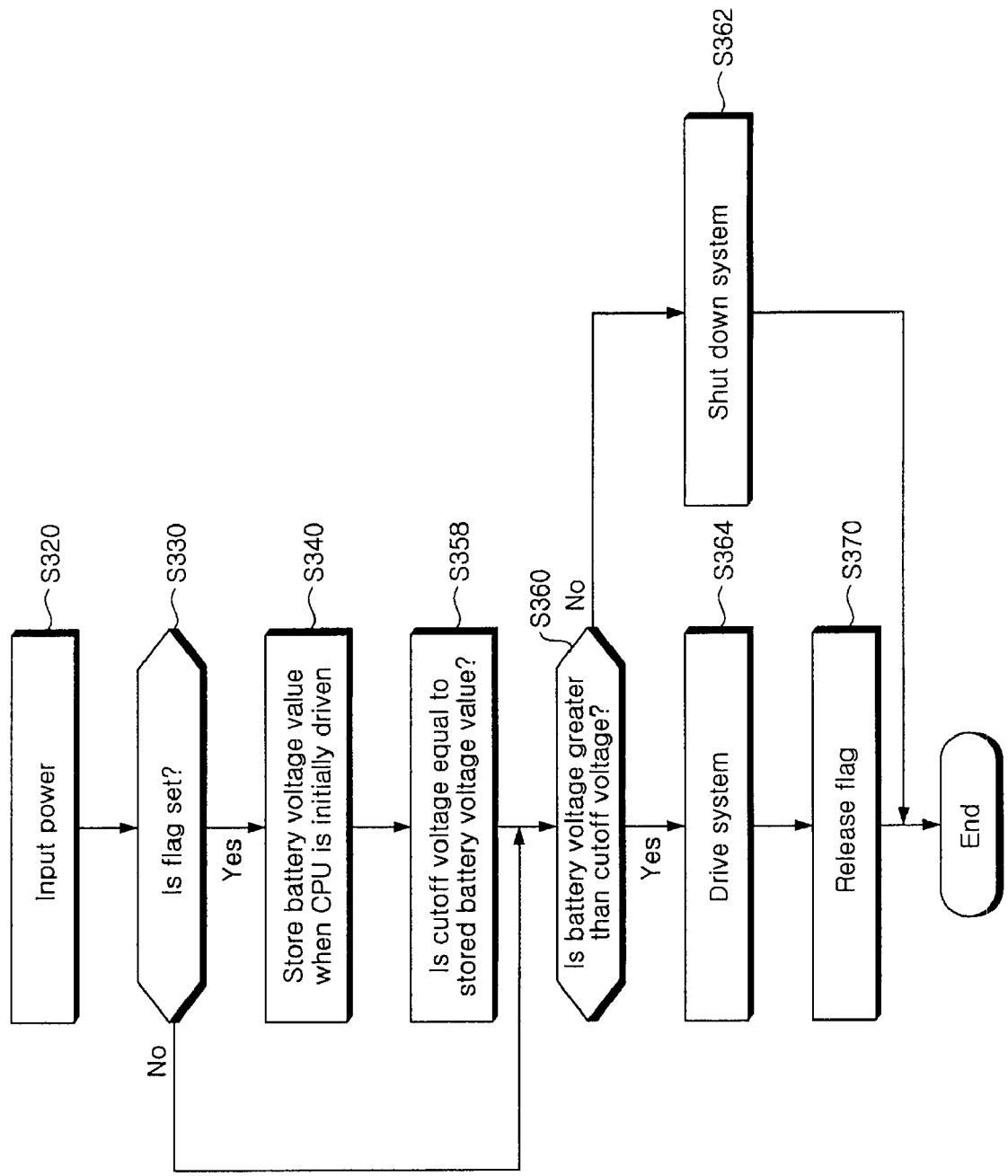
FIG. 5 is a flowchart illustrating a method of driving a terminal device according to a third embodiment of the present invention.

As shown in FIG. 5, in order to control the power of a terminal device according to the third embodiment of the present invention, it is first detected that a power signal is inputted (S320).

If the power input signal is detected, the power controller 30 determines whether the flag is set (S330). At this time, if the flag has not been set, the system is driven in accordance with a conventional driving process. That is, the step 360 described below is performed without additionally re-setting the cutoff voltage.

On the other hand, if the flag has been set, a voltage of the battery 10 which is measured in a state where only the CPU is driven and the other peripheral devices 50 are not yet driven when the system is driven is stored (S340). Then, the stored voltage of the battery 10 is set to the cutoff voltage (S358).

Thereafter, it is determined whether the present voltage of the battery 10 is higher than the cutoff voltage (S360).

If it is determined that the cutoff voltage is higher than or equal to the present voltage of the battery 10, the system is shut down (S362).

If the voltage of the battery 10 is higher than the present voltage of the battery, however, the system is driven (S364) and the flag is then released (S370).

Figure 6:
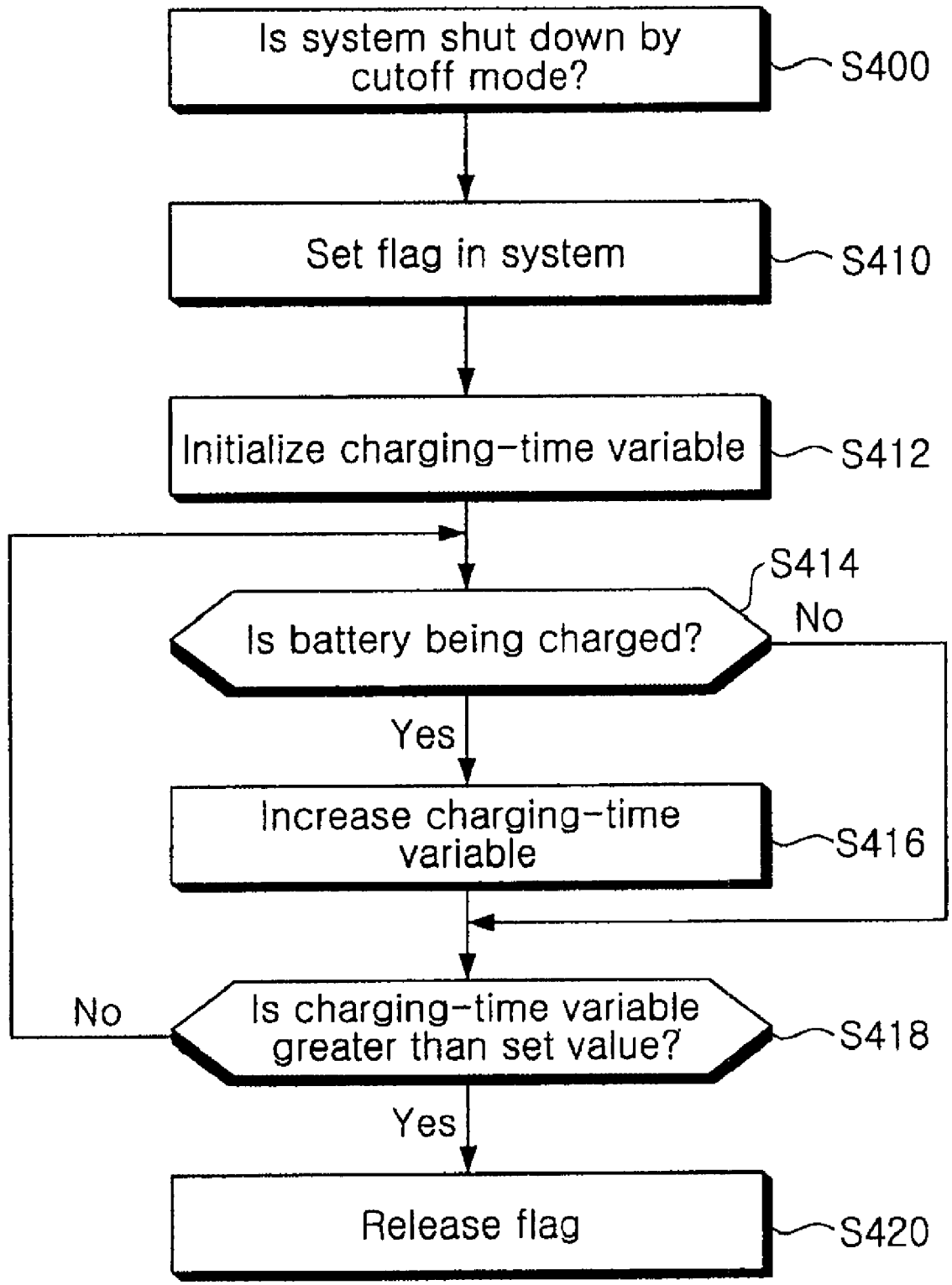
FIG. 6 is a flowchart illustrating a method of displaying a shutdown state of a terminal device according to a fourth embodiment of the present invention.
Figure 7:
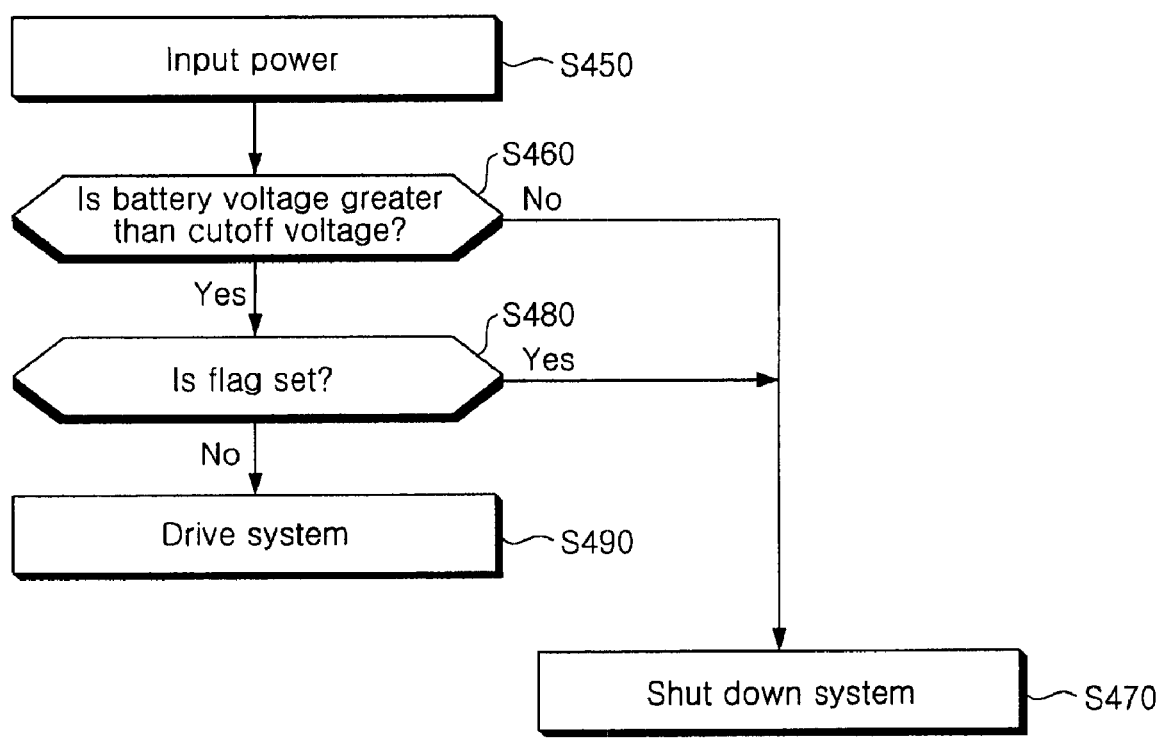
FIG. 7 is a flowchart illustrating a method of driving a terminal device according to the fourth embodiment of the present invention.

Meanwhile, as shown in FIGS. 6 and 7, in order to control the power of a terminal device according to a fourth embodiment of the present invention, it is first determined whether the system is shut down by the cutoff mode (S400).

Then, if it is determined that the system has been shut down by the cutoff mode, the flag is set (S410).

After the flag has been set, a charging-time variable is initialized (S412). The charging-time variable is a variable which is used to check charging time, wherein the initialization means that the charging-time variable is set to zero.

Then, it is determined whether the battery 10 is being charged (S414). If the battery 10 is not being charged, step S418 described below is performed and the battery waits for the charge.

If the battery 10 is being charged, however, the charging-time variable is increased by a predetermined increment (S416). After the charging-time variable has been increased, it is determined whether the charging-time variable is greater than or equal to a set value (S418). That is, it is to determine whether the battery 10 has been charged for more than a predetermined period of time. Accordingly, the set value is a minimum charging time of the battery 10 enough to drive the system.

At this time, if the charging-time variable is greater than or equal to the set value, the flag is released (S420). However, if the charging-time variable is smaller than the set value, the process is returned to step S414 to wait for the charge of the battery.

Next, as shown in FIG. 7, the system can be operated again when a system driving signal is received (S450).

If the system receives a system driving signal, it is determined whether the voltage of the battery 10 is higher than the cutoff voltage (S460). At this time, if the voltage of the battery 10 is not greater than the cutoff voltage, the system is shut down (S470).

If the voltage of the battery 10 is higher than the cutoff voltage, it is determined whether the flag is set (S480). If the flag has not been set, the system is driven (490).

Meanwhile, although the present invention has been described and illustrated in connection with the specific preferred embodiments, it will be readily understood by those skilled in the art that various modifications and changes can be made thereto without departing from the spirit and scope of the present invention defined by the appended claims.

The following advantages are expected from the power control apparatus and method of a terminal device according to the present invention.

That is, when applying the cutoff mode, different cutoff voltages are utilized according to the system shutdown state. Therefore, the system can be prevented from being operated when only the CPU is driven but from being again shut down by the cutoff mode when the peripheral devices are operated, after the system has been driven. Thus, there are advantages in that the remaining power of the battery can be maintained, and the overload due to frequent on and off operations of the system can be prevented from being applied to hardware and software thereof.

Further, in the present invention, the pre-charging time can be shortened. That is, if the battery is discharged to a low voltage, the pre-charging operation in which the battery is charged at a rate of 0.1 times as fast as a rate of the general charging should be performed to reduce the burden of charging. However, in the present invention, since on and off operation of the system is not induced at a voltage lower than the cutoff voltage, there is an advantage in that battery voltage is prevented from falling to a predetermined lower voltage.

What is claimed is:

1. A power control apparatus of a terminal device, comprising:

a power controller for controlling power supplied from a battery to the terminal device, wherein the power controller is configured to determine whether to apply power to a system when the system is shut down by a cutoff mode, the power controller determining whether to selectively apply power according to a state of a flag and determining an amount of power to be applied based on a determination of a first cutoff voltage or a second cutoff voltage; and a memory for storing first and second cutoff voltage values for shutting down the system upon determining that a voltage of the battery is lower than the first cutoff voltage or the second cutoff voltage, wherein the power controller sets the flag when the system is shut down by the cutoff mode, wherein if the flag has not been set when the system is driven, the power controller determines whether to apply power to the system based on the first cutoff voltage and if the flag has been set when the system is driven, the power controller determines whether to apply power to the system based on the second cutoff voltage.

2. The apparatus as claimed in claim 1, wherein the second cutoff voltage is higher than the first cutoff voltage.

3. The apparatus as claimed in claim 1, wherein the second cutoff voltage is a battery voltage value measured when only a central processing unit (CPU) of the system is driven in a state where the system is mounted with a battery having a voltage of the first cutoff voltage when the system is driven.

4. The apparatus as claimed in claim 1, wherein if the system is shut down by the cutoff mode within a predetermined period of time after the system has been driven, the power controller sets the second cutoff voltage to a battery voltage measured when the system is driven.

5. The apparatus as claimed in claim 1,
wherein the power controller measures charging time of the system in a state where the terminal device is powered off in order to release the flag only when the charging time is greater than or equal to a set value.

6. A method of controlling power of a terminal device, comprising:
   (A1) setting a flag in a system if the system is shut down by a cutoff mode;
   (A2) detecting input of the power;
   (A3) determining whether the flag is set in the system;
   (A4) comparing a battery voltage with a second cutoff voltage if it is determined that the flag has been set;
   (A5) releasing the set flag and driving the system if it is determined that the battery voltage is higher than the second cutoff voltage;
   (A6) shutting down the system if the battery voltage is lower than or equal to the second cutoff voltage;
   (A7) comparing the battery voltage with a first cutoff voltage if it is determined that the flag has not been set;
   (A8) after comparing the battery voltage with the first cutoff voltage, driving the system if it is determined that the battery voltage is higher than the first cutoff voltage; and
   (A9) shutting down the system if it is determined that the battery voltage is lower than or equal to the first cutoff voltage.

7. The method as claimed in claim 6, further comprising:
   (B1) if the flag has been set in the system, storing a battery voltage value measured when the system is driven according to determining that the battery voltage is higher than the second cutoff voltage;
   (B2) checking whether the power is cut off by the cutoff mode within a predetermined period of time;
   (B3) setting the second cutoff voltage to the stored battery voltage value if the power is cut off by the cutoff mode within the predetermined period of time; and
   (B4) waiting for additional input of the power.

8. The method as claimed in claim 7, wherein checking whether the power is cut off by the cutoff mode within the predetermined period of time comprises:
   (B21) initializing a time variable;
   (B22) increasing the time variable by a predetermined increment;
   (B23) comparing the time variable with a reference value;
   (B24) releasing the flag if the time variable is greater than the reference value; and
   (B25) determining whether the power is cut off by the cutoff mode if the time variable is smaller than or equal to the reference value.

9. The method as claimed in claim 8, comprising:
   (C1) detecting shutdown of the system by the cutoff mode;
   (C2) setting the flag in the system;
   (C3) counting charging time;
   (C4) releasing the set flag if the charging time is greater than or equal to a set time.

10. The method as claimed in claim 9, wherein counting of the charging time comprises:
    (C31) initializing a charging-time variable;
    (C32) determining whether a battery is being charged;
    (C33) increasing the charging-time variable by a predetermined increment if it is determined that the battery is being charged; and
    (C34) determining whether the charging-time variable is greater than or equal to a set value.

11. A method of driving a terminal device, comprising:
    (I1) detecting input of power;
    (I2) determining whether a flag is set in a system;
    (I3) comparing a battery voltage with a second cutoff voltage if it is determined that the flag has been set;
    (I4) releasing the set flag if it is determined that the battery voltage is higher than the second cutoff voltage;
    (I5) shutting down the system if it is determined that the battery voltage is lower than or equal to the second cutoff voltage;
    (I6) comparing the battery voltage with a first cutoff voltage if it is determined that the flag has not been set in the system;
    (I7) driving the system if the battery voltage is higher than the first cutoff voltage; and
    (I8) shutting down the system if the battery voltage is lower than or equal to the first cutoff voltage.

12. The method as claimed in claim 11, further comprising:
    (I11) storing a battery voltage value measured when the system is driven if the flag has been set in the system;
    (I12) checking whether the power is cut off by a cutoff mode within a predetermined period of time;
    (I13) setting the second cutoff voltage to the stored battery voltage value if the power is cut off by the cutoff mode within the predetermined period of time; and
    (I14) waiting for additional input of the power.

13. The method as claimed in claim 12, wherein checking whether the power is cut off by the cutoff mode within a predetermined period of time comprises:
    (I121) initializing a time variable;
    (I122) increasing the time variable by a predetermined increment;
    (I123) comparing the time variable with a reference value;
    (I124) releasing the flag if the time variable is greater than the reference value; and
    (I125) determining whether the power has been cut off by the cutoff mode if the time variable is smaller than or equal to the reference value.

14. The method as claimed in claim 11, further comprising:
    (I111) storing a battery voltage value measured while only a CPU is initially driven when the system is booted if it is determined the flag has been set in the system; and
    (I112) setting a cutoff voltage to the stored battery voltage value.

15. A power control apparatus of a terminal device, comprising:
    means for controlling power supplied from a battery to the terminal device and for determining whether to apply the power to the system when the system is shut down by a cutoff mode, including determining whether to selectively apply power according to a state of a flag and determining an amount of power to be applied based on a determination of a first cutoff voltage or a second cutoff voltage; and
    means for storing first and second cutoff voltage values for shutting down the system upon determining that a voltage of the battery is lower than the first cutoff voltage or the second cutoff voltage, wherein the means for determining whether to apply the power to the system sets the flag when the system is shut down by the cutoff mode, wherein if the flag has not been set when the system is driven, the means for determining whether to apply the power to the system determines whether to apply power to the system based on the first cutoff voltage and if the flag has been set when the system is driven, the means for determining whether to apply the power to the system determines whether to apply power to the system based on the second cutoff voltage.

16. A power control device of a terminal device, comprising:

a power controller for controlling power supplied from a battery to the terminal device, wherein the power controller is configured to determine whether to apply power to a system when the system is shut down by a cutoff mode, the power controller determining whether to selectively apply power according to a state of a flag and determining an amount of power to be applied based on a determination of a first cutoff voltage or a second cutoff voltage; and a memory for storing first and second cutoff voltage values for shutting down the system based upon a condition that a voltage of the battery is lower than the first cutoff voltage or the second cutoff voltage, wherein:

the power controller is configured to set the flag upon determining that the system is shut down by the cutoff mode, the power controller is configured to determine whether to apply power to the system based on the first cutoff voltage upon determining that the flag has not been set when the system is driven, and the power controller is configured to determine whether to apply power to the system based on the second cutoff voltage upon determining that the flag has been set when the system is driven.

* * * * *